United States Patent Office 2,908,574
Patented Oct. 13, 1959

2,908,574
ADDITIVE AND METHOD FOR IMPROVING WINE PRODUCTION

Hans Lüthi, Wadenswil, Switzerland, assignor to Hoffmann-La Roche Inc., Nutley, N.J., a corporation of New Jersey No Drawing. Application October 15, 1956
Serial No. 615,737
Claims priority, application Switzerland October 18, 1955
13 Claims. (Cl. 99—35)

It is a well-known fact that the alcoholic fermentation of substrates from fruits, such as pears and apples, plums, cherries, or berries such as currants, cranberries, blackberries, raspberries and strawberries, grapes, and vegatables such as rhubarb, often slows down and comes to an end prematurely. This phenomenon is particularly often encountered in the fermentation of concentrates of said fruits which have been stored for a more or less long period of time and then re-diluted to the desired concentration, or in the fermentation of mashes. These defective fermentations result not only in losses in the yield of alcohol due to residual amounts of carbohydrates which do not ferment out but also in undesired secondary fermentations (such as acetic, mannitol, glycerol and lactic fermentations). The fermentation or distillation products resulting from such defective fermentations may be unsuitable as beverages. Moreover, it is known that the re-fermentation of wines of reduced quality, or the secondary fermentation of sparkling wines in the bottles or in the vessel often causes much trouble. Although the addition of certain agents, such as ammonium sulphate, may under certain circumstances cause improvements, this expedient is in many cases not sufficient for overcoming the said difficulties.

It has now been found that the fermentation process can be considerably improved by adding to the fermentation substrate a mixture comprising ammonium sulfate, peptone (especially peptone obtained by enzymatic degradation of casein by means of pancreas enzyme [pancreatine]), thiamine, meso-inositol and biotin. Particularly good results are obtained if, in addition thereto, calcium pantothenate and/or adermin are added to the fermentation substrate. The absolute and relative amounts of the said ingredients which are to be used in each individual case can be selected according to the particular conditions of the fermentation and may be readily determined by experiments. It is advisable to combine the ingredients of the fermentation additive in such a manner that it contains 10,000 to 100,000 parts of ammonium sulphate, 500 to 10,000 parts of peptone, 50 to 5,000 parts of thiamine, 50 to 5,000 parts of meso-inositol and 1 to 10 parts of biotin to which mixture 50 to 3,000 parts of calcium pantothenate and/or 50 to 2,000 parts of adermin may advantageously be added.

As an example, a suitable additive comprises 17,450 parts of ammonium sulphate, 2,000 parts of peptone, 400 parts of thiamine, 150 parts of meso-inositol and 1 part of biotin. A preferred additive comprises 16,450 parts of ammonium sulphate, 2,000 parts of peptone, 400 parts of thiamine, 150 parts of meso-inositol, 1 part of biotin, 600 parts of calcium pantothenate and 400 parts of adermin. The additive of the present invention is conveniently added in an amount of 15 to 40 g. per hl. of the fermentation substrate. For kernel-fruit juices preferably 20 to 30 g. of additive are used per hl. of substrate, whereas for fruit mashes or re-diluted fruit juice concentrates about 30 to 40 g. of additive, and for the re-fermentation or secondary fermentation of wines and sparkling wines about 20 g. of additive are preferably used per hl. of substrate.

According to the present invention the fermentation additive is prepared by admixing the said ingredients. According to a suitable mode of execution the dry ingredients are reduced to fine powders, the resulting powders are passed through a fine screen, then intimately mixed, if desired by means of a mixing apparatus, and thereafter the resulting mixture is again passed through a screen.

In accordance with the present invention the fermentations are conveniently carried out by dissolving the new fermentation additive in about 2 liters of the substrate to be subjected to fermentation or in a small amount of water, and the resulting solution is thoroughly mixed with the fermentation substrate by stirring by means of a stirring rod or a pump. In the case of spontaneously fermenting substrates, the fermentation additive is conveniently added immediately after the preparation (by pressing or crushing) of the substrate, whereas, in the case of substrates which are to be fermented by adding yeasts, the fermentation additive is conveniently added simultaneously with the yeast culture. In order to prevent acetic acid fermentation it is advisable to conduct the fermentation with exclusion of air by means of a syphon. As a rule, a fermentation temperature comprised between 5 and 25° C. should be selected.

Alcoholic fermentations of substrates from fruits which are carried out by using the additive of the present invention proceed at a normal rate without any undesired secondary fermentations until the fermentable carbohydrates present in the fermentation substrate are consumed. This results in the production of palatable beverages. Moreover when carrying out the fermentations in accordance with the present invention, the flavour and bouquet of the obtained products are in many cases considerably improved.

The invention will now be illustrated by the following examples, however without being limited thereto.

EXAMPLE 1

*Fermentation of fresh juices of kernel-fruit (apples and pears), stone-fruit and grapes*

A sample of 1 to 2 liters was taken from 1 hl. of fruit juice to be subjected to alcoholic fermentation, obtained by pressing grapes, apples, pears, cherries or plums. To this sample were added 20 g. of an additive consisting of 16,450 parts of ammonium sulphate, 2,000 parts of peptone, 400 parts of thiamine, 150 parts of meso-inositol, 1 part of biotin, 600 parts of calcium pantothenate and 400 parts of adermin. The mixture was then stirred until the additive was completely dissolved. The resulting solution of the fermentation additive was then added to the main portion of the substrate. Complete homogenization of the substrate was achieved e.g. by stirring or circulating the substrate. At a fermentation temperature between 10 and 20° C. the fermentation time is about 3 to 6 days for grape juice and about 1 to 3 weeks for the other fruit juices mentioned. There were thus obtained sound alcoholic beverages which were completely fermented out and had a pronounced flavour and bouquet.

EXAMPLE 2

*Fermentation of juices of cultivated berries and vegetables*

In a manner similar to that described in Example 1, fermentation substrates were prepared by pressing currants or other cultivated berries or vegetables and adding 100 to 180% by volume of water and 30 to 60% by weight of cane-sugar or beet-sugar. Then, there were added to the fermentation substrate, per hl. thereof, 30 g. of the fermentation additive described in Example 1 together with a yeast culture of high fermentative activity. The fermentation mixture was then allowed to stand for 2 to 4 weeks at a temperature between 10 and 25° C. During this period the mixture fermented out completely, and a sound alcoholic beverage was obtained. This product can e.g. be used as dessert wine.

EXAMPLE 3

*Fermentation of juices of wild-growing berries*

Fermentation substrates from wild-growing berries, such as bilberries, cranberries, moor-berries, moss-berry cranberries, were prepared by pressing and adding e.g. 100% by volume of water and 50% by weight of cane-sugar or beet-root sugar. 40 g. of the fermentation additive described in Example 1 together with a yeast culture of high fermentative activity were added in the manner described above to 1 hl. each of this substrate. The mixture was then allowed to stand at a temperature of 15 to 25° C. for 2 to 4 weeks. It was thereby completely fermented out, and a sound palatable wine was obtained.

EXAMPLE 4

*Fermentation of re-diluted fruit juice concentrates*

A concentrate of e.g. 38° Bé. obtained by concentrating apple or pear juice was diluted with water to a specific gravity of 1.095 to 1.105. To this substrate there were added, per hl. thereof, 40 gr. of the fermentation additive described in Example 1 together with a yeast culture of high fermentative activity in the manner described above. The mixture was subjected to alcoholic fermentation at a temperature between 18 and 25° C. The resulting alcoholic product can be used as wine or dessert wine or as a base material for the preparation thereof and moreover for the preparation of vinegar.

In a similar manner, re-diluted concentrates of juices of other fruits, such as grapes, cherries or berries, or extracts or infusions of dried fruit, as well as honey can be fermented. A yeast culture of high fermentative activity can, if desired, be added to the substrate together with the fermentation additive.

EXAMPLE 5

*Fermentation of fruit mash*

40 g. of the fermentation additive described in Example 1 were dissolved in 2 to 3 liters of water. This solution was added in portions, while carefully mixing, to 100 kg. of fruit mash, e.g., from apples, pears, cherries, plums, yellow plums, apricots, currants, or raspberries, suitably while charging the substrate into the fermentation vessel. It is advisable to simultaneously add a yeast culture of high fermentative activity prepared in the usual manner. The mixture was allowed to stand for 3 to 5 weeks, preferably at a temperature between 15 and 18° C. As a rule, the substrate is completely fermented out at the end of this period of time. The resulting alcoholic product has a relatively high alcohol content and can be used for the preparation of distillates to be used as beverages.

EXAMPLE 6

*Fermentation of gentian root mashes*

The gentian root mash to be subjected to fermentation was prepared in the usual manner by adding an equal weight portion of water to the chopped root material, boiling the mixture with 0.1% sulphuric acid and subsequently neutralising the acid with calcined soda. After cooling, 40 g. of the fermentation additive described in Example 1 were added to the mixture in the manner described above. It is suitable to add to the mixture a culture of cold-fermenting yeast prepared in the usual manner. The mixture was allowed to stand at a temperature of about 20° C. The mash was completely fermented out within 2 to 3 weeks. Distillation of the resulting alcoholic product yielded an alcoholic beverage having a relatively high alcohol content.

EXAMPLE 7

*Refermentation of wines*

Sugar-containing wines which have become undrinkable as a result of undesired reactions in the course of their storage may have to be subjected to a re-fermentation. To this end, 20 g. of the fermentation additive described in Example 1 are added to the substrate, per hl. thereof, if desired after addition of sugar. It is convenient to add simultaneously the yeast culture prepared in the usual manner. In this manner sound wines are obtained.

EXAMPLE 8

*Fermentation of fresh kernel-fruit juices*

To a fermentation substrate obtained by pressing ripe apples and pears there were added, per hl. thereof, 18 g. of a fermentation salt consisting of 15,523 parts of ammonium sulphate, 1,800 parts of peptone, 360 parts of thiamine, 315 parts of mesoinositol and 2 parts of biotin. The fermentation proceeded at a normal rate until the sugar present in the fermentation substrate was consumed. Undesired secondary fermentations did not occur, and the final product was a sound, completely fermented fruit wine of desirable flavour.

EXAMPLE 9

*Fermentation of fresh berry juice*

To a fermentation substrate obtained by pressing currants there were added, per hl. thereof, 40 g. of a fermentation salt consisting of 40,000 parts of ammonium sulphate, 1,000 parts of peptone, 4,000 parts of thiamine, 100 parts of meso-inositol and 8 parts of biotin. The fermentation proceeded at a normal rate until the sugar present in the fermentation substrate was consumed. There was thus obtained a sound, completely fermented berry wine having a pronounced flavour.

EXAMPLE 10

*Fermentation of sparkling wines*

To a still wine base of the type used in the production of sparkling wines yeast and sugar were added in the usual manner. To this mixture there were added, per hl. thereof, 20 g. of fermentation additive prepared according to Example 1. A strong fermentation occurred and proceeded safely to its end.

I claim:

1. An additive for wine producing fermentation substrates derived from materials selected from the group consisting of fruit and vegetables which comprises 10 to 100 parts by weight of ammonium sulphate, 0.5 to 10 parts by weight of peptone, 0.05 to 5 parts by weight of thiamine, 0.05 to 5 parts by weight of meso-inositol and 0.001 to 0.01 part by weight of biotin.

2. An additive for wine producing fermentation substrates derived from materials selected from the group consisting of fruit and vegetables which comprises 10 to 100 parts by weight of ammonium sulphate, 0.5 to 10 parts by weight of peptone, 0.05 to 5 parts by weight of thiamine, 0.05 to 5 parts by weight of meso-inositol, 0.001 to 0.01 part by weight of biotin and a member of the group consisting of calcium pantothenate and adermin.

3. An additive for wine producing fermentation substrates derived from materials selected from the group consisting of fruit and vegetables which comprises 10 to 100 parts by weight of ammonium sulphate, 0.5 to 10 parts by weight of peptone, 0.05 to 5 parts by weight of thiamine, 0.05 to 5 parts by weight of meso-inositol, 0.001 to 0.01 part by weight of biotin and 0.05 to 3 parts by weight of calcium pantothenate.

4. An additive for wine producing fermentation substrates derived from materials selected from the group consisting of fruit and vegetables which comprises 10 to 100 parts by weight of ammonium sulphate, 0.5 to 10 parts by weight of peptone, 0.05 to 5 parts by weight of thiamine, 0.05 to 5 parts by weight of meso-inositol, 0.001 to 0.01 part by weight of biotin and 0.05 to 2 parts by weight of adermin.

5. An additive for wine producing fermentation substrates derived from materials selected from the group consisting of fruit and vegetables consisting essentially of 10 to 100 parts by weight of ammonium sulphate, 0.5 to 10 parts by weight of peptone, 0.05 to 5 parts by weight of thiamine, 0.05 to 5 parts by weight of meso-inositol, 0.001 to 0.01 part by weight of biotin and a member of the group consisting of calcium pantothenate and adermin.

6. An additive for wine producing fermentation substrates derived from materials selected from the group consisting of fruit and vegetables consisting essentially of 10 to 100 parts by weight of ammonium sulphate, 0.5 to 10 parts by weight of peptone, 0.05 to 5 parts by weight of thiamine, 0.05 to 5 parts by weight of meso-inositol, 0.001 to 0.01 part by weight of biotin and 0.05 to 3 parts by weight of calcium pantothenate.

7. An additive for wine producing fermentation substrates derived from materials selected from the group consisting of fruit and vegetables consisting essentially of 10 to 100 parts by weight of ammonium sulphate, 0.5 to 10 parts by weight of peptone, 0.05 to 5 parts by weight of thiamine, 0.05 to 5 parts by weight of meso-inositol, 0.001 to 0.01 part by weight of biotin and 0.05 to 2 parts by weight of adermin.

8. An additive for wine producing fermentation substrates derived from materials selected from the group consisting of fruit and vegetables consisting essentially of 10 to 100 parts by weight of ammonium sulphate, 0.5 to 10 parts by weight of peptone, 0.05 to 5 parts by weight of thiamine, 0.05 to 5 parts by weight of meso-inositol, 0.001 to 0.01 part by weight of biotin, 0.05 to 3 parts by weight of calcium pantothenate and 0.05 to 2 parts by weight of adermin.

9. A process for improving the production of wine from fermentation substrates derived from the materials of the group consisting of fruit and vegetables which comprises adding to the fermentation substrate an additive consisting essentially of 10 to 100 parts by weight of ammonium sulphate, 0.5 to 10 parts by weight of peptone, 0.05 to 5 parts by weight of thiamine, 0.05 to 5 parts by weight of meso-inositol and 0.001 to 0.01 part by weight of biotin, in a proportion of about 15 to 40 g. of additive per hectoliter of substrate.

10. A process for improving the production of wine from fermentation substrates derived from the materials of the group consisting of fruit and vegetables which comprises adding to the fermentation substrate an additive consisting essentially of 10 to 100 parts by weight of ammonium sulphate, 0.5 to 10 parts by weight of peptone, 0.05 to 5 parts by weight of thiamine, 0.05 to 5 parts by weight of meso-inositol and 0.001 to 0.01 part by weight of biotin, and a member of the group consisting of calcium pantothenate and adermin, in a proportion of about 15 to 40 g. of additive per hectoliter of substrate.

11. A process for improving the production of wine from fermentation substrates derived from the materials of the group consisting of fruit and vegetables which comprises adding to the fermentation substrate an additive consisting essentially of 10 to 100 parts by weight of ammonium sulphate, 0.5 to 10 parts by weight of peptone, 0.05 to 5 parts by weight of thiamine, 0.05 to 5 parts by weight of meso-inositol, 0.001 to 0.01 part by weight of biotin and 0.05 to 3 parts by weight of calcium pantothenate, in a proportion of about 15 to 40 g. of additive per hectoliter of substrate.

12. A process for improving the production of wine from fermentation substrates derived from the materials of the group consisting of fruit and vegetables which comprises adding to the fermentation substrate an additive consisting essentially of 10 to 100 parts by weight of ammonium sulphate, 0.5 to 10 parts by weight of peptone, 0.05 to 5 parts by weight of thiamine, 0.05 to 5 parts by weight of meso-inositol, 0.001 to 0.01 part by weight of biotin and 0.05 to 2 parts by weight of adermin, in a proportion of about 15 to 40 g. of additive per hectoliter of substrate.

13. A process for improving the production of wine from fermentation substrates derived from the materials of the group consisting of fruit and vegetables which comprises adding to the fermentation substrate an additive consisting essentially of 10 to 100 parts by weight of ammonium sulphate, 0.5 to 10 parts by weight of peptone, 0.05 to 5 parts by weight of thiamine, 0.05 to 5 parts by weight of meso-inositol, 0.001 to 0.01 part by weight of biotin, 0.05 to 3 parts by weight of calcium pantothenate and 0.05 to 2 parts by weight of adermin in a proportion of about 15 to 40 g. of additive per hectoliter of substrate.

References Cited in the file of this patent

UNITED STATES PATENTS

| | | |
|---|---|---|
| 2,311,418 | Schultz et al. | Feb. 16, 1943 |
| 2,608,484 | Bruinier | Aug. 26, 1952 |
| 2,716,084 | Carlson et al. | Aug. 23, 1955 |

OTHER REFERENCES

Organic Chemistry, by Fieser et al., Reinhold Publishing Co., New York (1956), pp. 1009, 1010 and 394 relied on.